(12) United States Patent
Everett et al.

(10) Patent No.: US 8,718,839 B2
(45) Date of Patent: May 6, 2014

(54) METHOD AND APPARATUS FOR AUTOMATICALLY CONTROLLING AIRCRAFT FLIGHT CONTROL TRIM SYSTEMS

(75) Inventors: Michael Louis Everett, El Paso, TX (US); Louis Jackson Everett, El Paso, TX (US); Mario Ruiz, Jr., El Paso, TX (US)

(73) Assignee: Evolved Aircraft Systems, L.L.C., El Paso, TX (US)

( * ) Notice: Subject to any disclaimer, the term of this patent is extended or adjusted under 35 U.S.C. 154(b) by 695 days.

(21) Appl. No.: 12/959,418

(22) Filed: Dec. 3, 2010

(65) Prior Publication Data

US 2011/0137496 A1 Jun. 9, 2011

Related U.S. Application Data

(60) Provisional application No. 61/267,075, filed on Dec. 6, 2009.

(51) Int. Cl.
   *G05D 1/00* (2006.01)

(52) U.S. Cl.
   USPC ............ 701/3; 701/4; 701/5; 701/6; 701/7; 701/8; 701/11; 701/12; 244/75.1; 244/76 R; 244/178; 244/220; 244/223

(58) Field of Classification Search
   USPC ....... 244/75.1, 220, 223, 178, 76 R; 701/3, 4, 701/5, 6, 7, 8, 15, 16, 11
   See application file for complete search history.

(56) References Cited

U.S. PATENT DOCUMENTS

| | | | | |
|---|---|---|---|---|
| 4,127,248 A | * | 11/1978 | Boone et al. | 244/180 |
| 4,382,282 A | * | 5/1983 | Graham et al. | 701/11 |
| 4,420,808 A | * | 12/1983 | Diamond et al. | 701/4 |
| 4,442,490 A | * | 4/1984 | Ross | 701/5 |
| 4,484,283 A | * | 11/1984 | Verzella et al. | 701/4 |
| 4,583,030 A | * | 4/1986 | Nixon | 318/580 |
| 4,684,085 A | * | 8/1987 | Berwick et al. | 244/178 |
| 4,758,958 A | * | 7/1988 | von Gersdorff | 701/4 |
| 4,825,375 A | * | 4/1989 | Nadkarni et al. | 701/3 |
| 5,001,646 A | * | 3/1991 | Caldwell et al. | 701/7 |
| 5,365,446 A | * | 11/1994 | Farineau et al. | 701/3 |

(Continued)

*Primary Examiner* — Thomas Black
*Assistant Examiner* — Sara Lewandroski
(74) *Attorney, Agent, or Firm* — William B. Shelby; Luis M. Ortiz; Kermit D. Lopez

(57) ABSTRACT

An automatic trim system and method is disclosed for automatically trimming a flight control surface of an aircraft. A force sensor measures a force applied by a pilot to a flight control system actuator. The length of time that the force is applied by the pilot is then timed by a timer. A trim system to reduce the applied force is included on the flight control surfaces. A processor determines if trim is required if a predetermined amount of time is exceeded based on the force sensor measurement. The processor can set the trim system to the trim required therein. An airspeed sensor is used to verify that the aircraft has sufficient speed for flight. A force sensor can be utilized to measure the input force being applied by the pilot. If a pilot input force is applied to the controls and the aircraft is in a steady state, a timer can be activated. If the force sensor continues to sense a force after the timer times for a predetermined time, the trim can be adjusted in the appropriate direction until the force sensor measures no significant pilot input force.

20 Claims, 4 Drawing Sheets

(56) References Cited

U.S. PATENT DOCUMENTS

| | | | | |
|---|---|---|---|---|
| 5,366,176 A | * | 11/1994 | Loewy et al. | 244/99.8 |
| 5,465,211 A | * | 11/1995 | Byrne, Jr. | 701/14 |
| 5,751,237 A | * | 5/1998 | Tanaka | 341/176 |
| 5,769,359 A | * | 6/1998 | Rutan et al. | 244/76 R |
| 6,128,554 A | * | 10/2000 | Damotte | 701/4 |
| 6,292,720 B1 | * | 9/2001 | Schulz et al. | 701/3 |
| 6,325,333 B1 | * | 12/2001 | Najmabadi et al. | 244/181 |
| 7,021,587 B1 | * | 4/2006 | Younkin | 244/178 |
| 7,284,984 B1 | * | 10/2007 | Zyskowski | 434/30 |
| 7,930,074 B2 | * | 4/2011 | Cherepinsky et al. | 701/12 |
| 8,014,906 B2 | * | 9/2011 | Luo | 701/3 |
| 2003/0106958 A1 | * | 6/2003 | Gold et al. | 244/17.13 |
| 2005/0173595 A1 | * | 8/2005 | Hoh | 244/223 |
| 2008/0097658 A1 | * | 4/2008 | Shue et al. | 701/8 |
| 2008/0237402 A1 | * | 10/2008 | Ausman et al. | 244/229 |
| 2009/0277369 A1 | * | 11/2009 | Gai et al. | 114/286 |
| 2010/0042271 A1 | * | 2/2010 | Holzhausen | 701/4 |
| 2010/0210391 A1 | * | 8/2010 | Dinger | 475/149 |
| 2011/0168851 A1 | * | 7/2011 | Cherepinsky | 244/223 |

* cited by examiner

METHOD AND APPARATUS FOR AUTOMATICALLY CONTROLLING AIRCRAFT FLIGHT CONTROL TRIM SYSTEMS

REFERENCE TO RELATED APPLICATION

This patent application claims priority under 35 U.S.C. §119(e) to U.S. Provisional Patent Application Ser. No. 61/267,075 entitled "Method or Apparatus for Automatically Controlling Aircraft Trim Systems", which was filed on Dec. 6, 2009, the disclosure of which is incorporated herein by reference.

TECHNICAL FIELD

Embodiments are generally related to aircraft flight control trim systems. Embodiments are also related to the field of automatically controlling aircraft flight control trim systems and methods therein.

BACKGROUND OF THE INVENTION

Aircraft control is typically achieved through the manipulation of control surfaces located on the wings and tail surfaces of the aircraft. Typical control surfaces include the elevator, rudder, and ailerons. When a control surface is moved, the aerodynamic forces acting on the control surface create a reaction force that is transmitted back through the control linkages to the pilot control yoke, giving the pilot a "feel" to the control of the aircraft. A pilot can immediately feel how much control is being exerted through the control yoke before the effect is manifested in a change in aircraft attitude.

Control feedback is thus a valuable aid in the flying of an aircraft. The aforementioned aerodynamic reaction forces, however, are not constant for all flying conditions such as airspeed and altitude. This gives rise to a residual force or back pressure that must be maintained continuously in steady level flight. In some aircraft, this force may be substantial, potentially creating significant pilot fatigue and pilot distraction. Maintaining an aircraft in a state of trim prevents the aircraft from deviating from the intended flight path, i.e. if the pilot were to release the control momentarily in an out of trim state the aircraft would change heading, altitude or bank, and furthermore, under certain conditions, the aircraft may quickly enter an uncomfortable or potentially dangerous attitude.

To counter the residual control force, various trim mechanisms may be installed to balance the residual force for a given flight condition. A trim tab installed on the control surface is a commonly chosen solution. The trim tab may be adjusted by the pilot to neutralize pressure for any given flight condition. Current trim technology on light aircraft consists of either manual control or electric control of moving trim tabs, bias assemblies, or other similar devices. These systems require input from a pilot to set the trim position. During critical flight maneuvers, trimming the aircraft can be a distraction for the pilot. Furthermore, manual systems can be very slow to operate depending upon their location and design. Electrically operated trim systems allow the pilot to make adjustments from a normal sitting position without having to reach for a manual trim wheel or other control, but can still be very slow during operation to avoid a pilot overshooting the target trim position, requiring the pilot to move the trim in the opposite direction. This can lead to a dangerous condition of the pilot over controlling the trim. Most electric trim systems are therefore designed to move slowly for more precise control and prevent over controlling the trim.

A system and method to automate trim control of a light aircraft during hand flown flight operations therefore would eliminate the need for pilot action, reducing pilot fatigue and distractions during critical flight maneuvers. Furthermore, an automatic trim control system would maintain an aircraft in a constant state of trim, thereby reducing flight path deviations.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide for an improved system to automate aircraft flight trim control.

It is another aspect of the disclosed embodiments to provide for a method of in-flight trim control.

The aforementioned aspects and other objectives and advantages can now be achieved as described herein. An automatic trim system and method is disclosed for automatically trimming a flight control surface of an aircraft. A force sensor can be employed, which measures a force applied by an operator to a flight control device. The length of time that the force is applied by the operator can then be timed by a timer. A trim system to reduce the applied force is provided on the flight control surfaces. A processor can determine if trim is required if the time of force application exceeds a predetermined amount of time based on the force sensor measurement and further adapted to set the trim system to the trim required.

A force sensor is utilized to measure magnitude and direction of a pilot input force to the flight control devices. If there is a pilot input force to the control devices and the aircraft is in a steady state, a timer is activated. If the force sensor continues to sense a force after the timer counts down to a predetermined time, the trim is adjusted in the appropriate direction until the force sensor does not measure a significant pilot input force.

Additionally, a secondary timer and counter system is utilized for fine tuning the trim. As an aircraft approaches an in trim state, a pilot will apply a short force application of pilot input force to the flight controls. A short force is a measurable force that is applied by the pilot, but is not applied long enough to run down the primary timer to the predetermined time. An application of a short force will be added to a counter. If the counter reaches a preset value, then the trim motor is very briefly activated and a value of 1 is subtracted from the counter so that the next tap of pilot input force will again activate the trim motor. If at any time a force is applied and measured in the opposite direction, then all counters and timers are reset to 0.

If the airspeed sensor measures airspeed below a preset value and the altimeter shows no change of altitude, then the trim is reset to the takeoff position. In addition, a single button is used to permit the pilot to activate the trim system to trim at any given behavior. So if the plane is held in a 30 degree banked turn and the pilot wants the plane trimmed, a single press of the button and the trim activates until the load is gone. The amount of residual load can also be selected by the pilot via an interface on the instrument, for example, if an operator prefers 0.25 pounds of back pressure while flying the operator can select this value and the trim will only activate to the point that this 0.25 pounds remains.

For safety, the pilot retains full control of the trim system and a set of trim switches such as trim up/trim down toggle (or aileron/rudder) can be used manually when the automatic system is switched off.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1A:
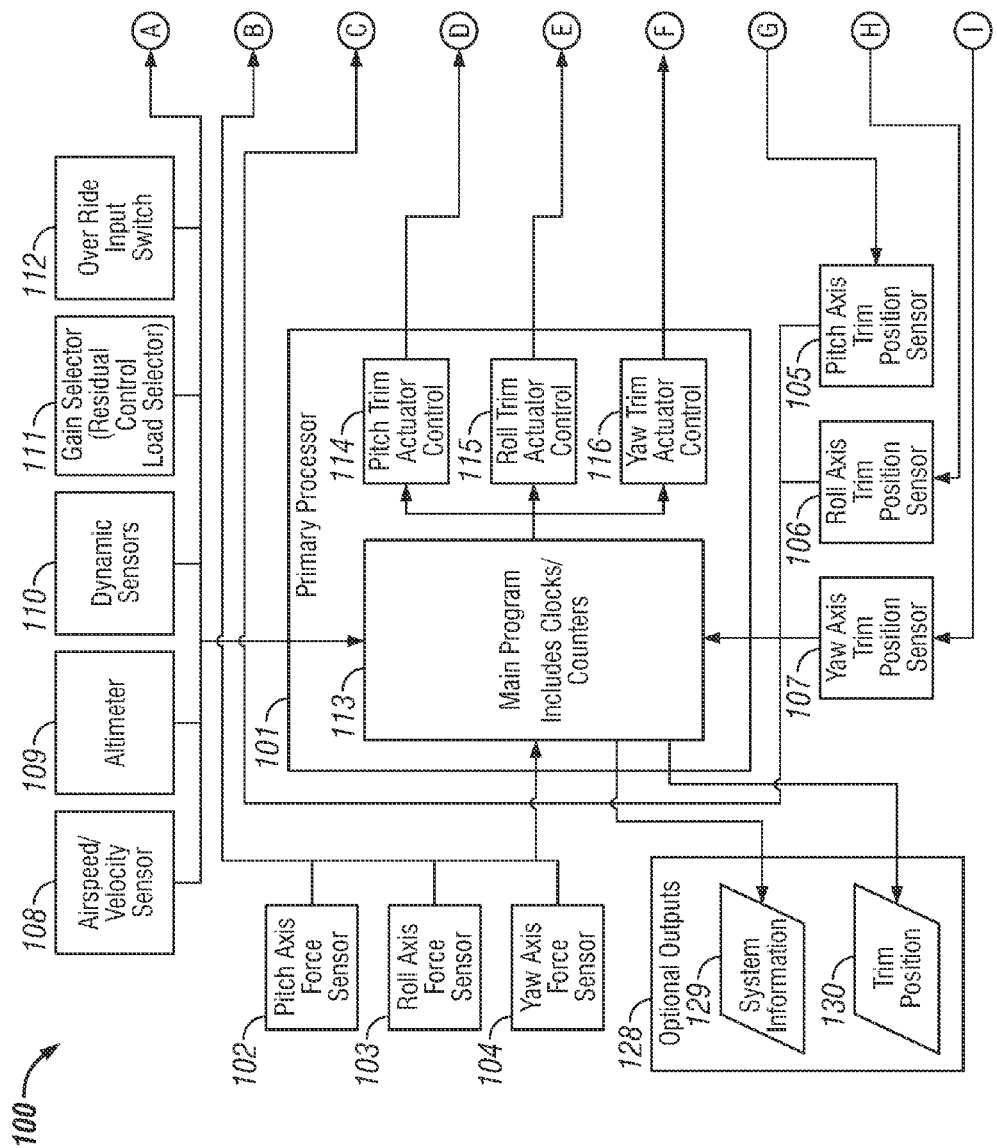
FIG. 1A illustrates a block diagram of an aircraft automatic trim system, which can be implemented in accordance with a preferred embodiment.
Figure 1B:
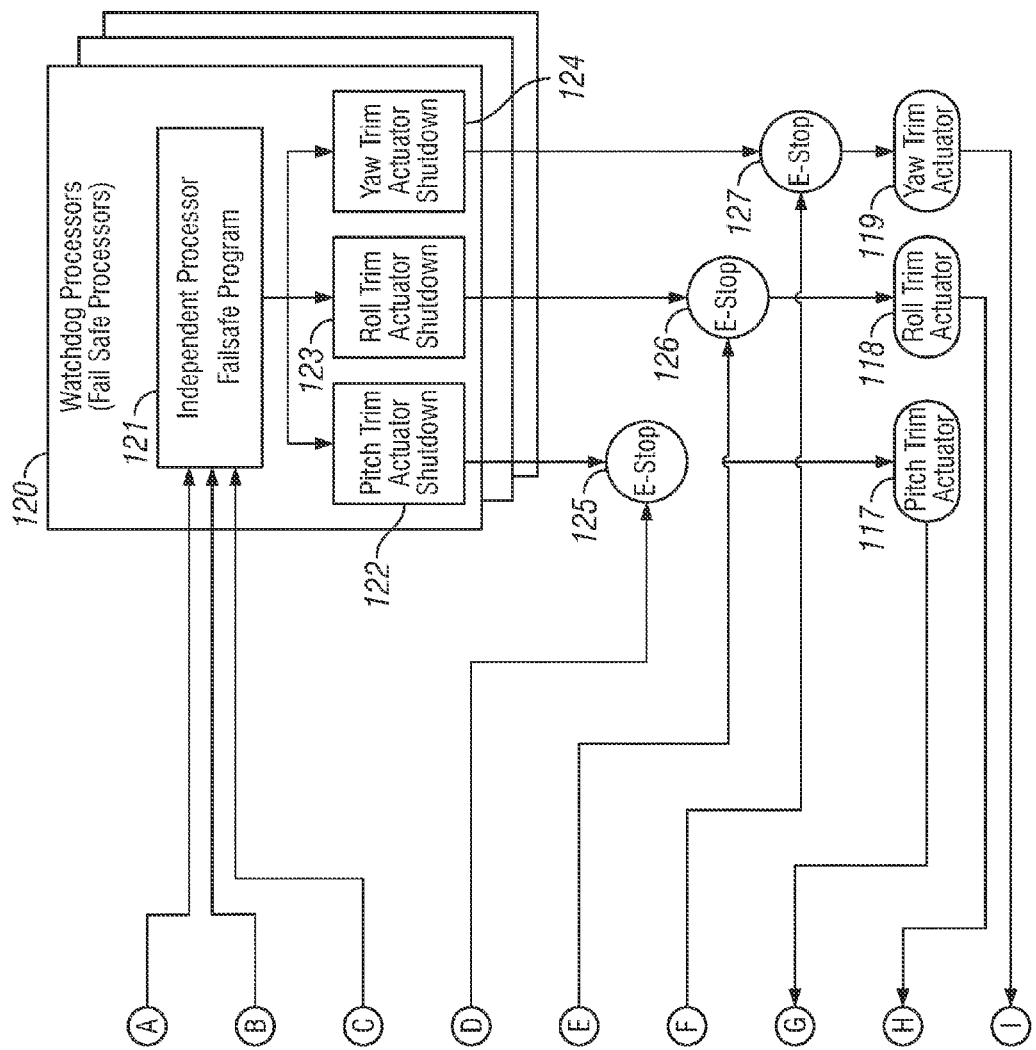
FIG. 1B illustrates a continuation of FIG. 1A, a block diagram of an aircraft automatic trim system, which can be implemented in accordance with a preferred embodiment.

FIGS. 1A and 1B illustrate a block diagram of an automatic aircraft trim system. The continuation points in FIG. 1A are illustrated by the letters A-I, which continue in FIG. 1B with the further illustration of automatic aircraft trim system 100. The automatic aircraft trim system 100 includes a primary processor 101 which determines if trim is required to reduce the pilot force input to the flight control actuators, among other functions. The primary processor 101 receives input from various sensors positioned on the aircraft. Each axis of the flight control system may include a force sensor; pitch axis force sensor 102 senses pilot input force to the flight control devices in the pitch axis, roll axis force sensor 103 senses pilot input force to the flight control devices in the roll axis, and yaw axis force sensor 104 senses pilot input force to the flight control devices in the yaw axis.

The flight control devices can also be referred to as "pilot flight controls" and include, but are not limited to, a yoke or control wheel and rudder pedals, side stick controller or any other pilot input device for controlling the aircraft flight control surfaces such as an elevator, ailerons and rudder or any other flight control surface. The three force sensors measure both the magnitude and the direction of the pilot input force and may include sensors such as strain gages, linear force sensors, torque sensors, bending force sensors or any other device for measuring magnitude and direction of an applied force. The pilot input force is utilized by the primary processor 101 to determine if the aircraft is in an "out of trim state" or an "in trim state". Force applied to the flight controls during a steady state flight regime would indicate an out of trim condition while, conversely, an in trim condition would be indicated by a lack of pilot input force to the flight controls sensed by the force sensors 102, 103 and 104.

Primary processor 101 receives information about the position of the trim control tabs and the airspeed of the aircraft. There are three trim position sensors: pitch axis trim position sensor 105, roll axis trim position sensor 106, and yaw axis trim position sensor 107. The trim position sensors 105, 106 and 107 determine the position of the trim tabs or other flight control trim devices and input these determined positions to the primary processor 101. Alternate methods of trim position sensing may be interchanged with the position sensors 105-107. Such devices may include algorithms that monitor speed and time to calculate position, or any other device or method for determining trim position.

Airspeed sensor 108 inputs the current airspeed measured to the primary processor 101. Airspeed sensor 108 is not limited to but may include airspeed sensors such as a pilot/static airspeed sensor, GPS sensors or any other device that measures aircraft speed. The airspeed sensor 108 sends the measured airspeed to the primary processor 101 which then determines if the aircraft is at a sufficient speed for flight. One non-limiting example would be wherein the minimum speed for system activation is $0.75\ V_{SO}$, or 75% of the stall speed in a landing configuration for the aircraft. This would prevent automatic trim system activation until a safe speed for flight has been achieved and prevent system activation after landing. Any appropriate speed could be utilized for system activation. The system activation speed could furthermore be a selectable option by the operator or pilot.

Primary processor 101 receives information from an altimeter 109. Altimeter 109 is not limited to but may include altitude sensors such as a static altimeter sensor, GPS sensors or any other device for measuring aircraft altitude above mean sea level (MSL) or above ground level (AGL).

Optional dynamic sensors 110 may also input information to the primary processor 101. A variety of different sensors can be used to measure dynamic behavior of the aircraft, i.e. gyros, attitude heading reference system (AHRS), accelerometers, magnetometers, GPS, etc., and are herein listed as a single component labeled as dynamic sensors 110. Dynamic sensors 110 determine the behavior of the aircraft with respect to the control inputs made by the pilot. Dynamic sensors 110 provide benefits to the automatic trim system 100 including, but not limited to, the ability to identify potential accelerated stall conditions or abrupt maneuvers, as well as to make determinations as to a change of condition. For example, if the aircraft is maneuvering in one direction at the time of automatic trim system 100 activation and subsequently is stabilized, the system can be configured to make the appropriate correction to compensate for this behavior. Dynamic sensors 110 could further include sensors determining throttle position, engine RPM, manifold pressure or any other sensor utilized to determine if the aircraft is on the ground or in flight.

Gain selector 111 provides an option to select an amount of force to add to the neutral point. The gain selector 111 allows the pilot or operator to control an amount of force wherein the primary processor 101 stops trimming the trim actuators 117-119.

Primary processor 101 further includes the main program 113. The main program 113 may also be referred to as a software module contained within a memory of the primary processor 101. Main program 113 includes the instructions for primary processor 101, including monitoring of sensors, determining trim requirements and implementing trim positioning. Main program 113 may further include all clocks and/or timers required by the automatic trim system 100.

Timer and counter functions required may also be performed by a stand-alone timer and counter and need not be solely performed by the main program 113. Other functions of the primary processor 101 include the actuator controls for the three trim axis trim actuators: pitch trim actuator control 114, roll trim actuator control 115, and yaw trim actuator control 116. The programming of processor 101 and main program 113 may vary dependent upon design considerations. The ultimate outcome of such programming can perform functions described herein. Force sensors 102, 103, and 104 may be interchanged with alternate devices for determining that the pilot is attempting to make a force application to the aircraft control systems. GPS or alternate navigation based technology may be incorporated in addition or in exchange with velocity sensor 108 to make a determination as to vehicle speed and/or position (such as three position axis) thus could be used for system activation-deactivation, as well as reset or other alternate functions.

Sensors such as accelerometers, gyroscopes, or any other device for determining motion may be utilized in addition to or in exchange for the timers and counters discussed herein in order to compensate for turbulence, vibration, or other forces that may result in vehicle motion not due to the unbalanced aerodynamic forces caused by out of trim conditions. In addition, gyroscopes and/or accelerometers may be incorporated so that they can send data to processor 101 indicative of vehicle motions about the trim axis. Such implementations may be utilized to send the processor into a standby state so that no trim activation occurs during times of rapid rotation such as, but not limited to, abrupt maneuvers including aerobatics.

Further, any device or process used to make a determination as to operator preferences or other operator input criteria may be implemented in addition to or in exchange of the designed method for processor input. Such devices may or may not include memory positions to store input data, seat position sensing, occupant weight or vehicle weight sensing to recall operator settings or any other effective methods. Failsafe methods may be interchanged with more advanced, more sophisticated processes which may or may not be in existence as of the date of this filing. Thus new technologies may be incorporated as they become available.

Pitch, roll, and yaw trim actuators 117, 118 and 119 are the mechanical actuators which move the trim tabs or devices to the desired position as determined by the primary processor 101. Pitch, roll, and yaw trim actuators 117, 118 and 119 can be any mechanical device that moves the trim tabs on the respective control surface including, but not limited to, electrical, mechanical, electro-hydraulic, servo motors or other hydro-mechanical actuation associated with computer/processor control, etc.

Over-ride input switch 112 allows the pilot to call for the automatic trim system 100 to immediately activate and trim the aircraft. Over-ride input switch 112 sends a signal to primary processor 101 to activate the trim system regardless of counter or timer countdowns. For example, if there is a force applied to the controls by the pilot and the pilot desires that the force be trimmed out without waiting for the processor to calculate the normal time or input counts, a single press of the over-ride input switch 112 will cause the processor 101 to trim immediately as required. For safety, the pilot retains full manual control of the trim system and a set of trim switches such as trim up/trim down toggle (or aileron/rudder) can be used manually when the automatic system 100 is switched off.

Watchdog processors 120 are independent processors that perform limited tasks. The watchdog processors 120 are independent processors that can shut down aspects of the system that may cause harm if there is a fault or error in the primary processor 101. For example, a watchdog processor 120 may only be tasked with watching the airspeed and trim position. If the airspeed is too low (below flight speeds) and the automatic trim system is active in a direction away from the takeoff position, the watchdog would shut down the trim actuators 117, 118 and 119 through E-stop switches 125, 126, and 127. Another watchdog processor 120 may watch the force and the trim position and will shut down the system if the trim actuators 117, 118, and 119 are active while no force is present. Any number of watchdog processors can be utilized and are depicted by a single block 120 on FIG. 1B. AH watchdog processors 120 can be independent (physically separate processors) or a single processor can be programmed with multiple tasks or any combination therein.

Optional outputs 128 allow the primary processor 101 to send optional information to the pilot. These optional outputs 128 could be automatic trim system information 129 and trim position 130. Other system information could be displayed depending upon design considerations.

Automatic trim system 100 is integrated into an aircraft so that pitch, roll, and yaw force sensors 102, 103 or 104 are utilized to measure a pilot input force to the flight control devices. The automatic trim system 100 may be installed and operational on all three flight axes or any combination of axes or only on a single axis.

If there is a pilot input force to the control devices and the aircraft is in a steady state, as determined by the primary processor 101, a timer within the main program 113 is activated. If the pitch, roll, and yaw force sensors 102, 103 or 104 continue to sense a force after the timer 113 counts down to a predetermined time, the trim is adjusted in the appropriate direction by pitch, roll, and yaw trim actuator controls 114, 115, and 116 and pitch, roll, and yaw trim actuators 117, 118, and 119 until the pitch, roll, and yaw force sensors 102, 103 or 104 measure no pilot input force. If primary processor 101 determines that the aircraft is maneuvering before the trim is activated, then the trim will not activate; however, if the trim is active when aircraft maneuvers begin, the trim will remain on for a period of time that is based upon the magnitude of the force measured by force sensors 102-104 when the maneuvers began.

The automatic trim system 100 described herein utilizes a timer within the primary processor 101 to time a predetermined time before trim activation. This is due to turbulence which may be sustained by the aircraft. Short force inputs by the pilot to the flight control devices to counter this turbulence would not exceed the predetermined time or delay and therefore the system would not automatically trim the aircraft. If the force applied by the pilot is sustained for a period of time that equals or exceeds the predetermined time, the primary processor 101 will determine if the aircraft is in a safe mode to trim based upon inputs from sensors 108-110. A non-limiting example of the predetermined time utilized could be a time of three seconds. If sensors 108-110 provide a signal that the aircraft is safe to trim, the primary processor 101 and trim actuator controls 114, 115, and 116 activate the trim actuators 117-119 in the appropriate direction until the measured force by the pitch, roll, and yaw force sensors 102-104 falls below a neutral setting or the force applied is released.

Additionally, a secondary timer and counter system encompassed with main program 113 can be utilized for fine-tuning the trim. As the aircraft approaches an in trim state, the pilot will typically apply a short force application of pilot input force to the flight control device to maintain the desired flight path. A short force application is an input force that is applied by the pilot, but is not applied long enough to exceed the predetermined time. A single application of a short force application will be added to the counter within main program 113.

If the counter reaches a preset value, then the trim actuator controls 114, 115, and 116 send a signal to trim actuators 117, 118 or 119 to be briefly activated for a short trim pulse and the main program 113 subtracts a value of 1 from the counter so that the next short force application will again activate the trim actuator 117, 118 or 119. If at any time a pilot input force is applied and measured by force sensors 102, 103 or 104 in the opposite direction than the previous pilot input force, all counters and timers within main program 113 are reset to zero. A pilot input force in the opposite direction from a previous input force indicates the aircraft is in trim, and therefore automatic trimming is not required. For example, if the pilot inputs one or two pulses of back pressure (nose up pilot input force) followed by one pulse of forward pressure, the counters and timers are zeroed as it is assumed that the aircraft is in trim and the pilot is applying normal hand flying inputs to the controls without the necessity of trim changes.

The automatic trim system 100 can automatically set the trim to a takeoff setting. If the airspeed sensor measures airspeed below a preset value and the altimeter shows no change of altitude, then the trim is reset to the takeoff position. In addition, a single actuation button may be used to permit the pilot to trim for any given behavior. An example would be if the plane is held in a 30 degree banked turn and the pilot wants the plane trimmed, a single press of the button and the trim activates until the load is gone. The amount of residual load can also be selected by the pilot via an interface on the instrument, for example, if an operator prefers 0.25 pounds of back pressure while flying they can select this value and the trim will only activate to the point that this 0.25 pounds remains.

Figure 2:
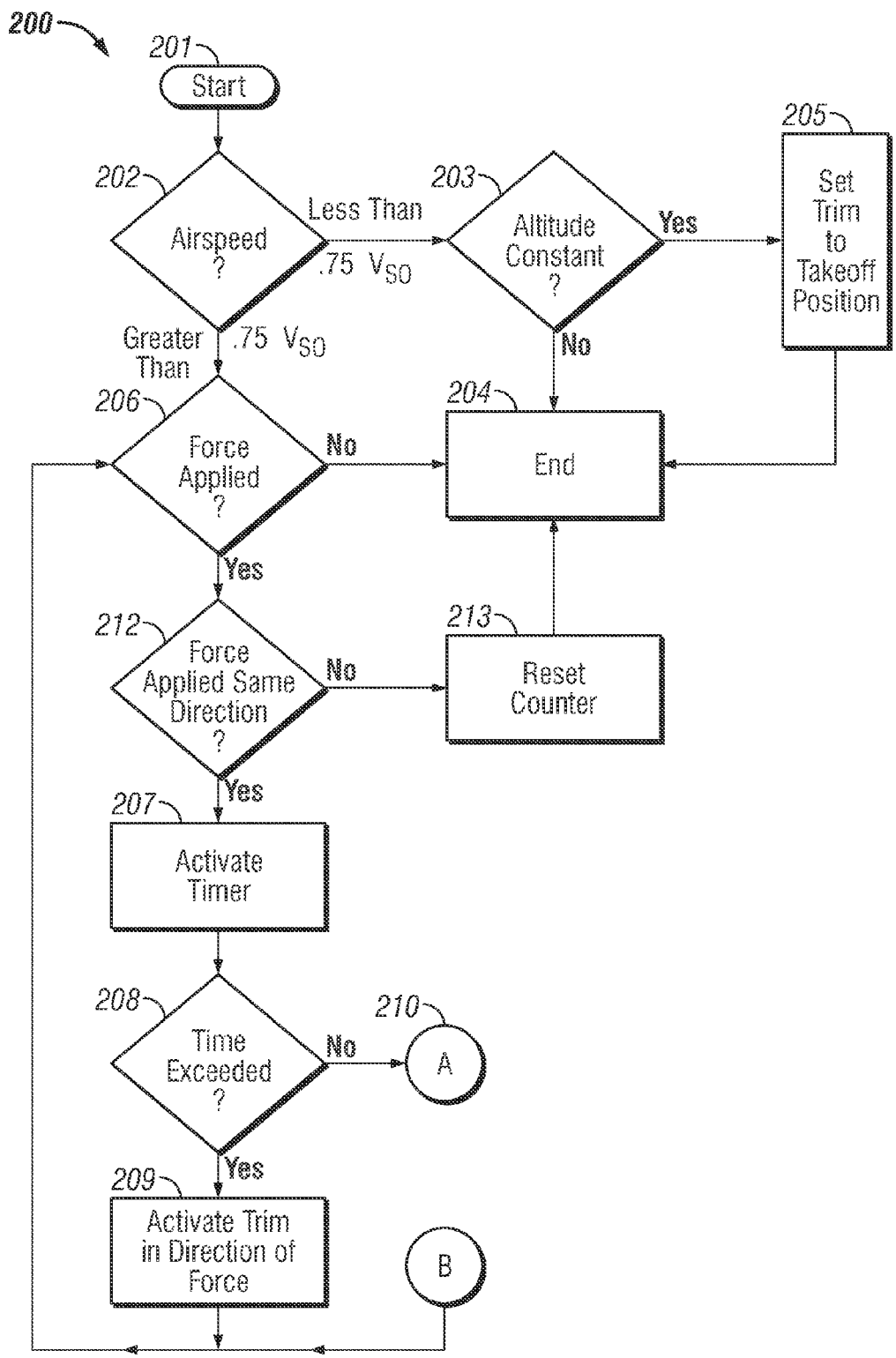
FIG. 2 illustrates a high level flow chart illustrating logical operational steps of a method for automatically trimming an aircraft, which can be implemented in accordance with an alternative embodiment.

FIG. 2 illustrates a high level flow chart 200 illustrating logical operational steps of a method for automatically trimming an aircraft. The method starts at block 201. The next step is a determination if the aircraft airspeed is less or greater than a predetermined airspeed, as shown in block 202. A non-limiting example of the airspeed to determine could be 0.75 $V_{SO}$, or 75% of the landing configuration stall speed. This airspeed is utilized to activate and deactivate the automatic trim system after takeoff and landing and prevent automatic trim movement during a stall recovery. If the airspeed is below the predetermined airspeed, a further determination is made as to the altitude, shown in block 203. If the altitude is constant, the system sets the trim to the takeoff configuration, shown in block 205 and then ends at block 204. If the altitude is not constant, as possibly during stall recovery, the system does nothing and ends at block 204.

If the step at block 202 determines that the airspeed is greater than the predetermined speed, the processor thereafter determines if there is a pilot input force applied to the control devices, shown at block 206. The determination of a pilot input force to the control devices would be assumed to be at zero if the measured force is below the neutral force plus the added gain. If a pilot input force is measured, a determination is made as to the direction of the applied pilot input force, as shown at block 212. If the pilot input force is not applied in the same direction as the previous pilot input force, the timer and counter are reset, as shown at block 213. If the pilot input force is applied in the same direction as the previous pilot input force, a signal is sent to activate the primary timer, block 207. If the pilot input force as measured by the force sensors 102, 103 or 104 ends before a predetermined time has elapsed, the method continues at step A, FIG. 2, as indicated at block 210; however, if the pilot input force is input as long as or longer than the predetermined time, the steps continue at block 209 wherein the appropriate trim actuator 117, 118 or 119 is activated in the appropriate direction as measured by force sensors 102, 103 or 104. A non-limiting example of a predetermined time could be three seconds, but other times could be selected depending upon design considerations.

Figure 3:
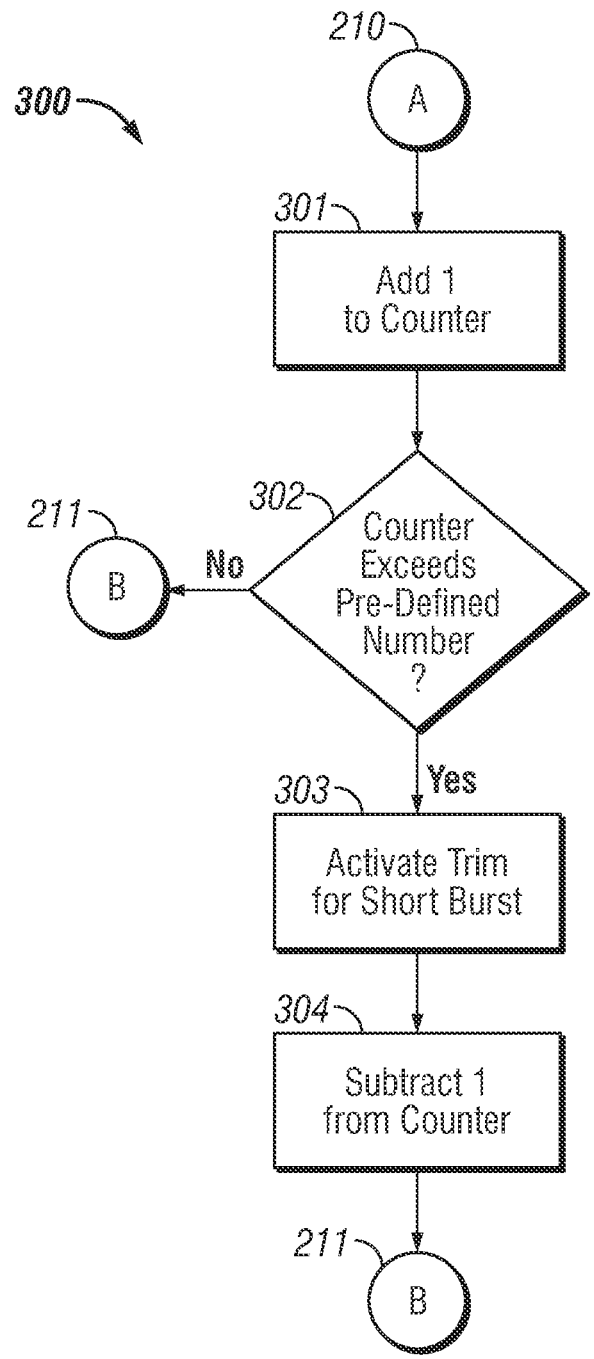
FIG. 3 illustrates a high level flow chart illustrating logical operational steps of a method for automatically trimming an aircraft, which can be implemented in accordance with an alternative embodiment.

FIG. 3 illustrates a high level flow chart 300 illustrating logical operational steps of a method for automatically trimming an aircraft and is a continuation of FIG. 2 at block 210. As indicated at block 208 in FIG. 2, if the pilot input force is input as long as or longer than the predetermined time, then one is added to a counter in the main program 113, shown as block 301. Block 302 shows a determination is made as to whether or not the counter has exceeded a predefined number, a non-limiting example of which could be three. If the counter has not exceeded the predefined number, then the method continues at step B, block 211. However, if the counter has exceeded the predefined number, the appropriate trim activator 117, 118 or 119 is activated for a short burst, shown as block 303. A short burst trim actuator is defined as small movement of the trim actuator for a predefined time in order to move the trim for only fine tuning of the trim. This time could be any short time as defined by design considerations, for example, one half of a second. The speed of the trim actuator would determine the appropriate time for a short burst; faster trim actuators require a shorter time and vice versa for a slower trim actuator. Block 304 indicates the next step wherein one is subtracted from the counter in the main program 113. Step B is the next step as indicated at block 211 wherein the method returns to FIG. 2 step 206 and the process is repeated.

Upon successful integration of the components and the programming, the pilot may operate the aircraft by normal operating procedures. For safety, an airspeed switch may be integrated to prevent the system from activating the trim system prior to reaching a sufficient speed required for flight. Once the processor 101 determines the aircraft is at an acceptable speed the system will become active. If this device is not installed the operator will be required to manually engage the system via some form of switching device. The automatic trim system 100 described herein will not activate any trim actuators while the aircraft is in trim. If the aircraft is not in a state of trim, the operator will be required to apply a force to the control system in a direction and magnitude to compensate for the unbalanced aerodynamic forces.

The processor 101 can identify that a force is being applied and will activate a series of timers and counters (duration of these devices will vary by aircraft model) based upon various algorithms. If this force is determined to be of sufficient duration and magnitude, the processor 101 will output the appropriate signals to the trim actuator controls 114-116. The trim actuators 117-119 will then activate in the appropriate direction (based upon the output signal from the processor 101) for the duration required to eliminate the force from the control system. If a variable speed actuator is installed in the aircraft trim system, the processor 101 and trim actuator controls 114-116 will make an advanced determination as to the appropriate speed of the actuator to eliminate the applied load from the control column or other control device. Once the load is eliminated to a point of near zero the processor 101 will determine that the aircraft is in a state of trim and all actuators will shut off. In a state of trim, the aircraft will remain in or on its trajectory path without any pilot input. Actual settings of the timers and counters, as well as the specific numbers of these devices used within the main program 113, will vary based upon aircraft and design specifications.

Additionally, the system 100 provides the benefit of a control assist system similar to a power steering device at speeds at which aerodynamic surfaces are effective. This can be done by modification to the timers and counters. If a large force is measured, the trim actuators 117-119 can be energized immediately and the processor 101 switched to a simple force feedback design. This device would require a trim actuator 117-119 that is variable speed capable in order to achieve this trait. Further, any industry or field in which a trimming device is employed or could be employed would benefit from this technology.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. An apparatus, comprising:
   at least one force sensor that measures an input force applied by an operator to a control device;
   a timer that measures a length of time said input force is applied during a steady state motion;
   a trim system to reduce said input force applied to said control device; and
   a processor that determines if trim is required due to said input force if said length of time exceeds a predetermined amount of time and wherein said processor further sets said trim system to an amount of trim required therein.

2. The apparatus of claim 1 wherein said at least one force sensor comprises at least one of a pitch axis force sensor, a roll axis force sensor or a yaw axis force sensor.

3. The apparatus of claim 1, further comprising:
   at least one sensor for measuring airspeed or altitude of a vehicle comprising said apparatus.

4. The apparatus of claim 3, wherein:
   said vehicle comprises an aircraft; and
   said timer operates as a function of a said processor.

5. The apparatus of claim 4, further comprising:
   a counter that counts applications of said input force to said control device.

6. The apparatus of claim 5, wherein said counter counts said applications if said applications of said input force is applied to said control device less than a predetermined time as measured by said timer.

7. A method, comprising:
   measuring an input force applied by an operator to a control device by at least one force sensor;
   timing a length of time said input force is applied during a steady state motion; and
   determining if trim is required to reduce said input force applied to said control device utilizing a trim system if said length of time exceeds a predetermined amount of time and further adapted to set a trim system to an amount of trim required.

8. The method of claim 7, further comprising:
   configuring said at least one force sensor to comprise at least one of a pitch axis force sensor, a roll axis force sensor or a yaw axis force sensor.

9. The method of claim 7, further comprising:
   measuring at least one of airspeed or altitude of a vehicle.

10. The method of claim 9, wherein said vehicle is an aircraft and said timer is performed as a function of a processor.

11. The method of claim 10, further comprising:
    counting a number of applications of said input force to said control device.

12. The method of claim 11, further comprising:
    counting said number of applications via a counter, if said length of time is less than a predetermined time as measured by said timer.

13. A method, comprising:
    measuring a magnitude and direction of an input force applied by an operator to an aircraft control device by at least one force sensor;
    timing a length of time said input force is applied during a steady state motion utilizing a processor;
    determining if trim is required due to said input force if said length of time exceeds a predetermined amount of time and setting a trim system to an amount of trim required;
    counting a number of applications of said input force to said control device if said length of time does not exceed a predetermined amount of time; and
    activating a trim actuator for a pre-set amount of time if said number exceeds a predetermined number of applications.

14. The method of claim 13, further comprising the step of:
    setting said length of time to zero if said input force direction is in an opposite direction than an immediately subsequent measured input force.

15. The method of claim 14, further comprising the step of:
    setting said number of applications to zero if said input force direction is in an opposite direction than said immediately subsequent measured input force.

16. The method of claim 13, further comprising configuring said at least one force sensor to comprise at least one of a pitch axis force sensor, a roll axis force sensor or a yaw axis force sensor.

17. The method of claim 13, further comprising the step of:
    measuring at least one of airspeed or altitude of said aircraft to activate said processor if it is determined that said aircraft is in-flight based on said airspeed or said altitude.

18. The method of claim 17, further comprising the step of:
    activating said trim actuator to set a trim tab of said aircraft to a takeoff setting if it is determined that said aircraft is on the ground based on said airspeed or said altitude.

19. The method of claim 17, further comprising configuring said at least one force sensor to comprise at least one of a pitch axis force sensor, a roll axis force sensor or a yaw axis force sensor.

20. The method of claim 19, further comprising the step of:
    setting said number of applications to zero if said input force direction is in an opposite direction than said immediately subsequent measured input force.

* * * * *